United States Patent [19]
Dean et al.

[11] 3,785,698
[45] Jan. 15, 1974

[54] COVER TOP FOR PICKUP TRUCK BEDS

[75] Inventors: William H. Dean, Phoenix, Ariz.;
Richard W. Henes, 5901 E. Calle Del Sud, Phoenix, Ariz. 85018

[73] Assignee: said Henes, by said Dean

[22] Filed: July 13, 1971

[21] Appl. No.: 162,149

[52] U.S. Cl............................................... 296/137 B
[51] Int. Cl.............................................. B60j 7/10
[58] Field of Search................. 296/137 B, 100, 26, 296/27; 292/19, 87, 80, DIG. 6, DIG. 73; 220/32, 42 B

[56] References Cited
UNITED STATES PATENTS

| | | | |
|---|---|---|---|
| 2,989,340 | 6/1961 | Penner | 296/100 |
| 3,619,001 | 11/1971 | Borskey | 296/137 B |
| 3,489,456 | 1/1970 | Klanke | 296/100 |
| 3,051,523 | 8/1961 | Smith | 296/100 |
| 3,012,814 | 12/1961 | Penner | 296/100 |

*Primary Examiner*—Robert R. Song
*Attorney*—William H. Dean

[57] ABSTRACT

A cover for pickup truck beds, said cover releasably hinged on a horizontal axis to the forward end of a pickup truck bed; and an inverted U-shaped stand pivoted to a rearward portion of said cover and having legs with bearing means slidably operable in tracks secured in generally horizontal disposition at opposite inner sides of said pickup truck bed.

10 Claims, 24 Drawing Figures

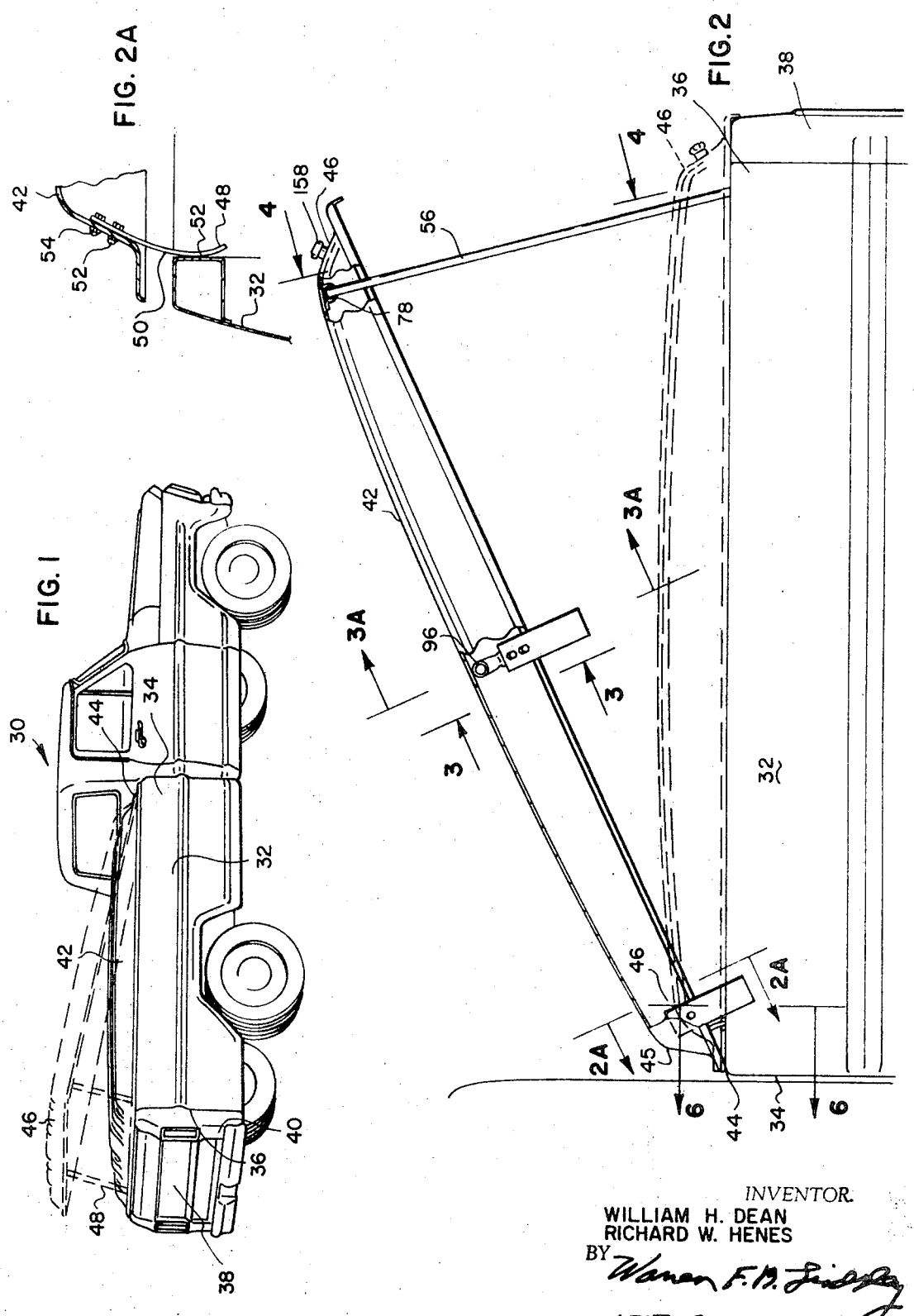

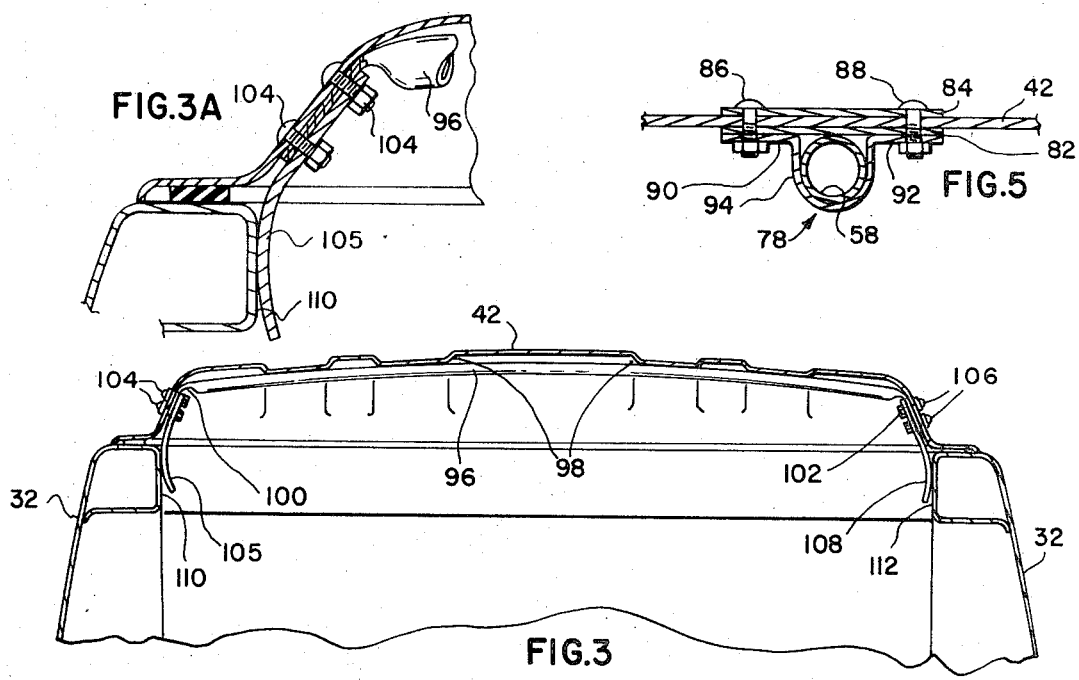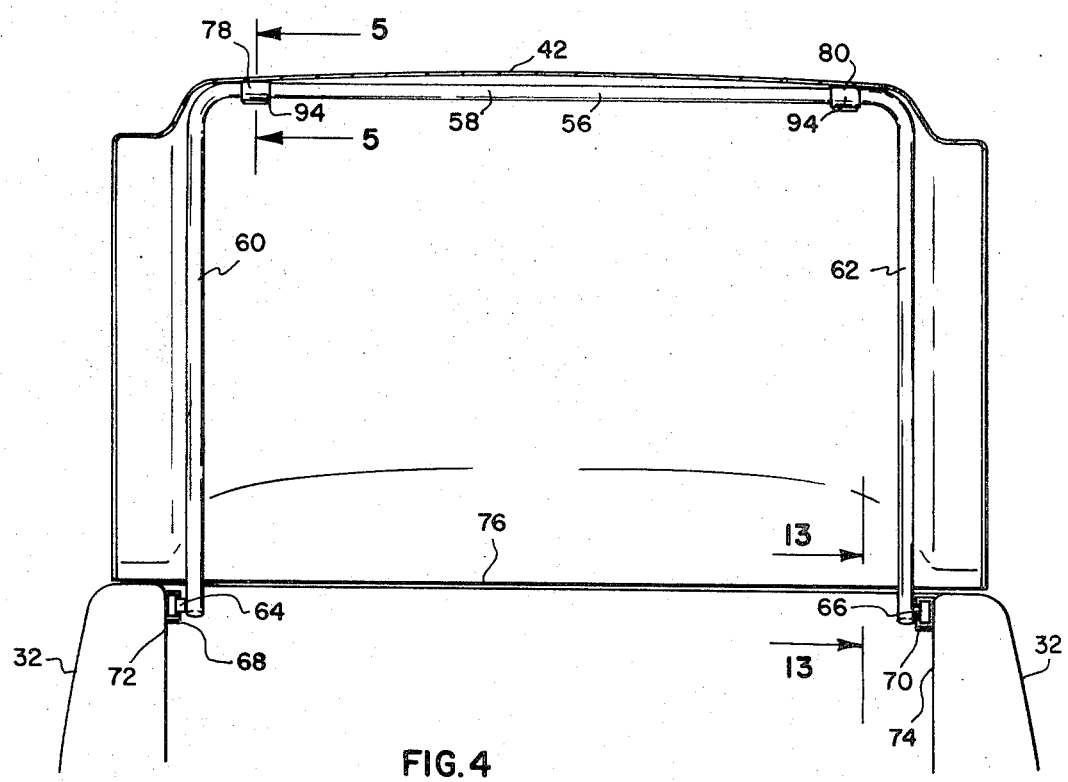

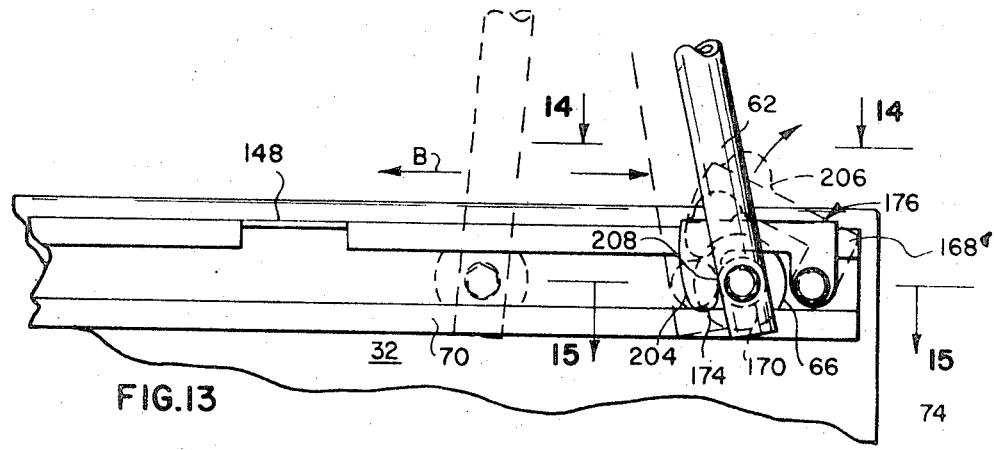
FIG.13
FIG.14
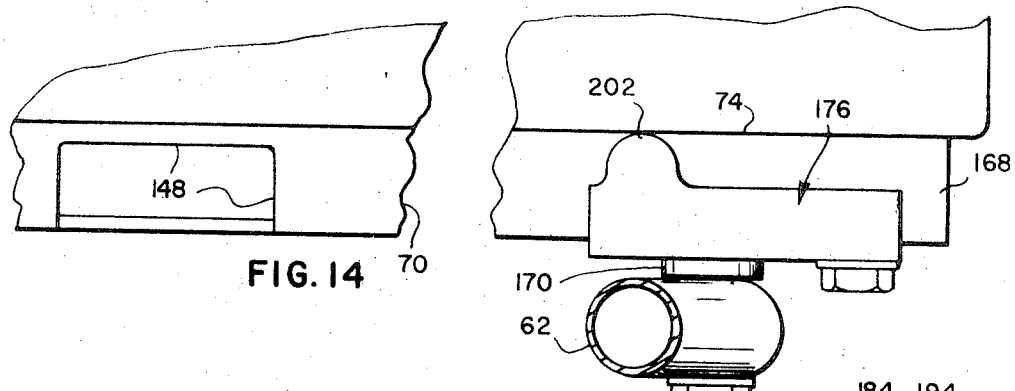
FIG.15
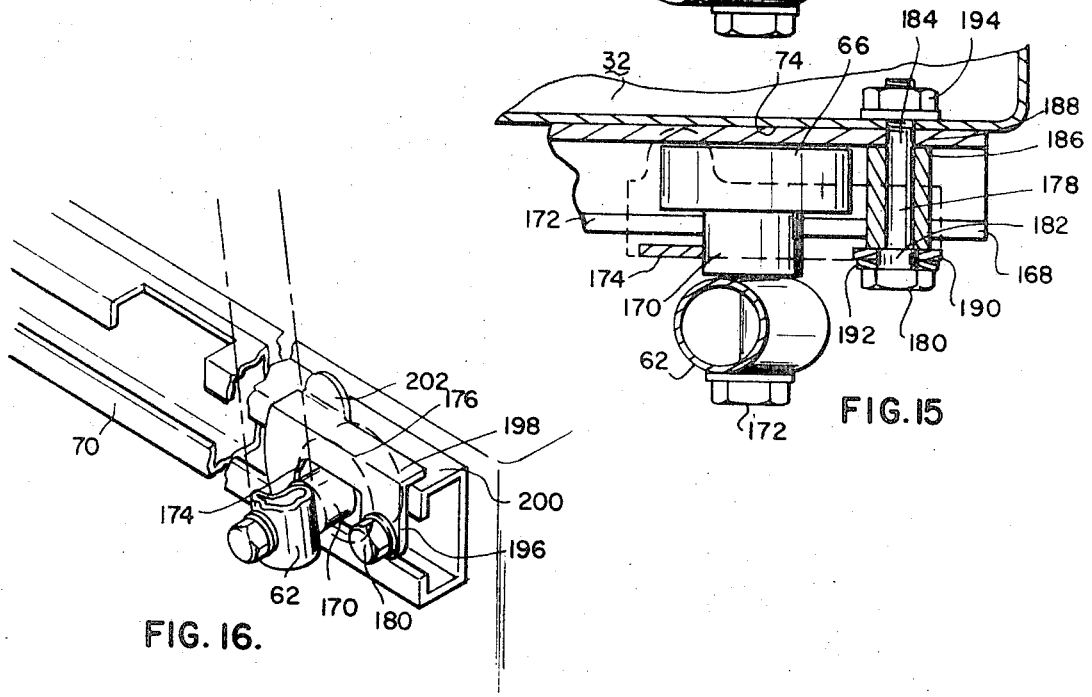
FIG.16.

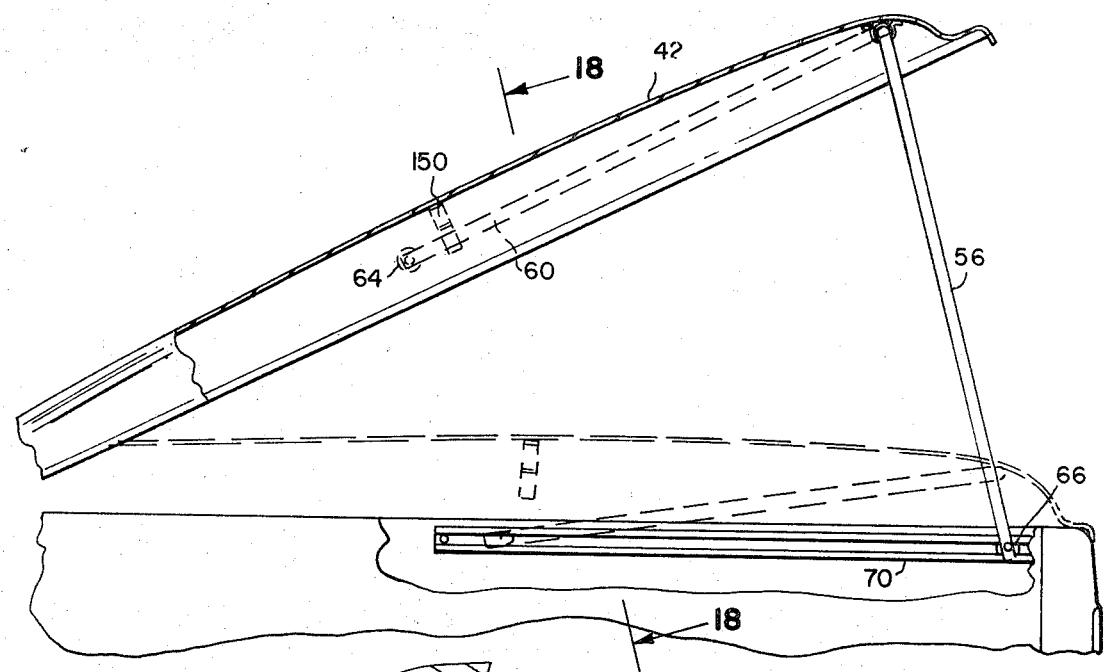
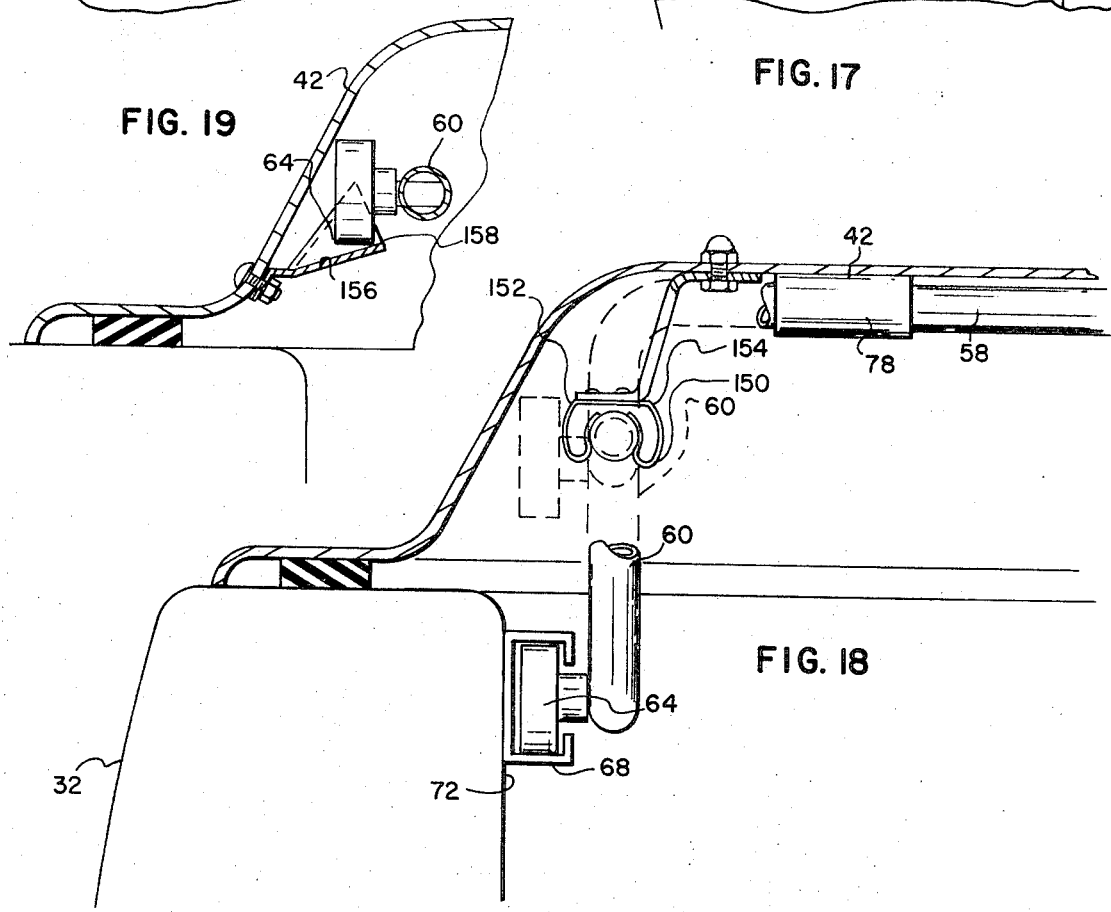
FIG. 17
FIG. 19
FIG. 18

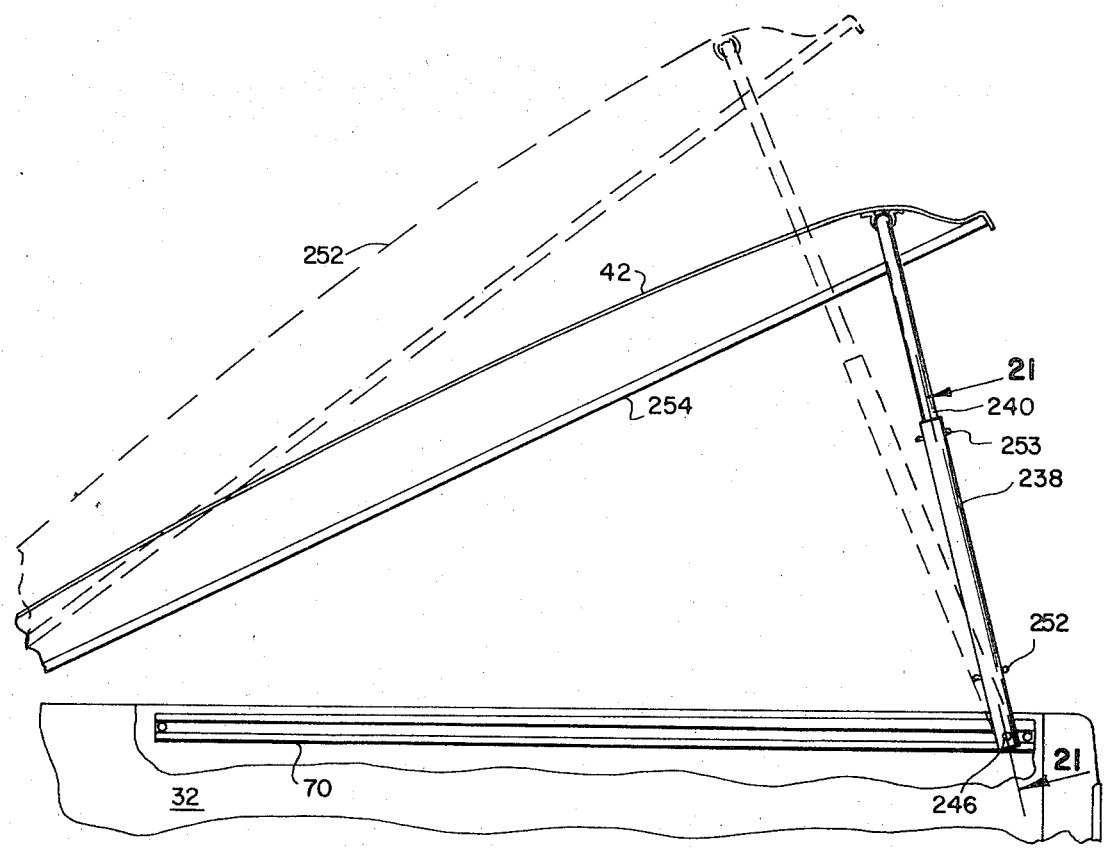
FIG. 20
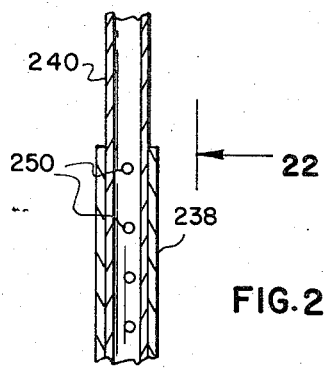
FIG. 21
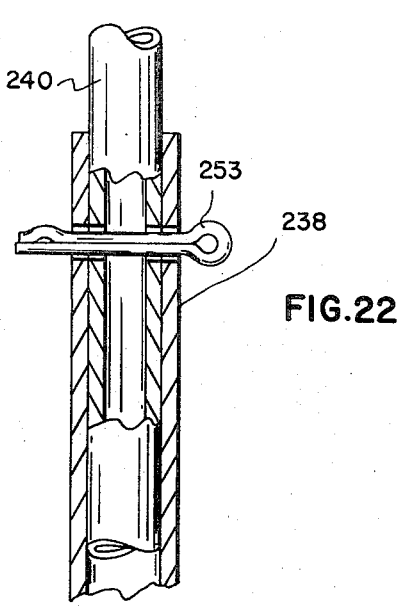
FIG. 22
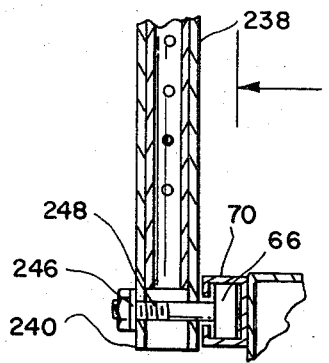

COVER TOP FOR PICKUP TRUCK BEDS

BACKGROUND OF THE INVENTION

Pickup trucks, which are usable for a great variety of purposes, are generally provided with box-shaped beds having an upper open side and at the rearward portions of these beds are pivoted tailgates which pivot on a horizontal axis near the floor of the bed and pivot downwardly and outwardly in a rearward direction into a generally horizontal position and generally at a plane of the floor of the truck bed.

Such pickup truck beds are generally utilized for a great variety of purposes for hauling large and small articles, and heretofore it has been found desirable to provide covers for such truck beds in order to protect various cargo from the elements.

Many of these covers have been made of flexible material such as canvas or other fabric or plastic materials, and such flexible covers have been secured to pickup truck beds by hooks, ropes, snaps, and other devices. These covers have been unsatisfactory in many ways due to the fact that rain collects in the tops of them and tends to form a pool as the top of the flexible cover is deflected. Additionally, the many snaps and rope connections required to maintain such covers in position are undesirable due to the fact that they require considerable time and effort in the connection and disconnection of such covers relative to truck beds.

Such flexible covers are also unsatisfactory due to the fact that many of them shrink, and when secured to truck beds by snaps are troublesome since they cannot be snapped onto the truck bed after they have shrunk.

Many of the prior art covers require a great many fixtures to be secured to a truck bed in order to hold such a cover thereover.

Various metal covers have been used for pickup truck beds and these covers are quite shallow, thereby limiting the vertical space in which articles may be hauled in the pickup truck bed. Many of the shallow metal covers are fixed by hinges at the forward ends of the truck beds and are so connected that they require considerable time and effort to remove them so that the truck bed may be used for hauling large articles which extend normally above the area of the shallow covers.

Various pivoted covers have been provided for pickup truck beds and such covers have used various types of stands for holding them in pivoted upward position. However, such stands have been generally, in one way or another, bolted to the pickup truck bed and the covers so as to prevent them from readily being removable.

Many pickup trucks are utilized by tradesmen who carry tools and other valuable equipment which should be protected from the elements and also should be locked up to prevent theft thereof. However, tradesmen find it necessary to utilize their trucks in many instances to haul large articles, and if they desire to have a cover for securing valuable articles in the truck bed, the cover must be readily removable in order to permit the truck bed to be utilized for hauling large articles.

Accordingly, prior art truck bed covers have been generally unsatisfactory for one reason or another, as for example the canvas covers are difficult to use and maintain; most of the shallow rigid covers are not provided with sufficiently simple hardware so as to enable the cover to be readily removed from the pickup truck when desired. Furthermore, most of the fixtures utilized for pivoting covers to a truck bed and for supporting them in an upward open position, are relatively complicated and difficult to remove, thereby causing operators thereof a great waste of time and inconvenience during the removal and replacement of such shallow covers relative to a pickup truck bed.

Many pickup truck users desire a pickup truck bed cover for a great variety of uses, however, when valuable articles are carried in the bed, the cover should be provided with means for locking it in secure position and the cover should be relatively weatherproof so as to protect valuable articles transported in pickup truck beds. Many owners of pickup trucks use them for recreation and sporting events such as hunting and fishing, and also for commercial purposes. Accordingly, a shallow cover must be readily removable for commercial use and may then be readily replaced on the truck bed for covering articles such as sporting goods and various other pieces of equipment that a sportsman may wish to transport into the outdoors. Covers for such purposes must protect the sporting equipment from weather and theft.

Many truck bed covers are made of metal and are fairly heavy and require a substantial amount of labor to produce them. Consequently, they are quite expensive and such metal tops are subject to denting ane other damage difficult to repair.

SUMMARY OF THE INVENTION

In accordance with the present invention, a cover for pickup truck beds is provided with releasable hinge structure disposed on a horizontal axis at the forward end of a pickup truck bed and the cover is provided with a U-shaped inverted stand pivoted to a rearward portion of the cover at the inner side thereof and the stand is provided with legs having bearing means slidably operable in tracks secured in generally horizontal disposition at opposite inner sides of the pickup truck bed so as to permit pivotal raising of the cover of the invention to an elevated open position relative to the rearward portion of the truck bed and to hold it in such position so that it may readily be lowered by pivoting the stand and allowing the bearing means to traverse said tracks such that the cover may be lowered to a closed position relative to the rear end of the pickup truck bed.

The invention thus comprises very simple means including a releasable hinge structure, and the stand of the invention is readily removable relative to said tracks without unbolting or altering the structure of the stand. The releasable hinge structure at the forward end of the cover is very easily, readily, and quickly releasable from the pickup truck bed so that the entire cover of the invention may be removed in approximately 1 minute, or replaced within 1 minute, by a single operator.

The invention also comprises novel releasable hinge means for the forward end of the cover of the invention, such that the pivotal bearings of the hinge means may be readily released by rearward movement of the cover relative to the hinge means, and may readily be replaced by a forward movement of the cover relative to the hinge means.

The invention comprises novel mechanism of the releasable hinge means at the forward end of the cover for releasing the cover relative to the pickup truck bed on which it is pivotally mounted. The releasable hinge means requires no tools and does not require removal of bolts or other mechanisms to release the hinges. One part of each hinge is coupled to a forward portion of the truck bed and another part of each hinge means is secured to the cover of the invention adjacent to forward end of a truck bed. A hook shaped portion on the part of the hinge coupled to the truck bed, is open in a rearward direction, and the part of the hinge coupled to the cover is pivotally mounted in the hook shaped portion. The part of the hinge connected to the cover is provided with a downwardly directed arcuate plate portion held captive forwardly of a complemental arcuate plate portion of the hinge portion coupled to the truck bed so that, in the normal open and closed positions, the part of the hinge coupled to the cover is held captive in the hinge structure connected to the truck bed; and whereby when the stand, which supports the rear end of the cover of the invention in open position, is released from its tracks and the rearward portion of the cover is moved upwardly beyond the normal open position the arcuate plate portion of the hinge structure, held by the cover, clears the complemental portion of the hinge structure secured to the truck bed, allowing the hinges to be separated by moving the hinge plate, coupled to the cover, directly rearwardly and out of said hook portion of the hinge part coupled to the truck bed. This mechanism is used in combination with very simple stand releasing means wherein track following bearings of the stand legs are removed through notches in the upper flanges of the channel shaped tracks so that all of the requirements for releasing and removing the cover from the truck bed may be preformed manually without tools or without removing any fixtures of any kind.

The invention also comprises novel flexible facric curtains at the sides and rearward end of the cover which extend from the inner portions of the cover downwardly and outwardly over the sides and the rear portion of the pickup truck bed and downwardly over the tailgate thereof when in open position, to provide a substantial enclosure in which campers may escape from the elements and may use as adequate shelter during rainstorms and for sleeping purposes. The curtains are readily removably connected to the inner side of the cover at their opposite sides and rearward end and may thus convert the truck bed cover of the invention from a utility cover for commercial uses to a truck bed cover for outdoor sporting use during hunting and fishing events or the like.

The main body of the cover of the invention is preferably formed of a thermoplastic material such as ABS or the like whereby a relatively small amount of labor is utilized as compared to the construction of conventional aluminum tops or covers. The thermoplastic material such as ABS has high impact resistance and is not easily subject to denting or deformation; it is very tough and stands a considerable amount of abuse and handling. These thermoplastic covers, however, are relatively flexible and the invention compirses novel cross members and clip structure comprising a horizontally disposed transverse support member on the inner lower side of the flexible thermoformed cover. The support member is disposed intermediate forward and rearward ends of the cover and at its opposite ends is provided with clip structure extending downwardly and substantially contiguous to inner sides of a pickup truck bed when the cover is in closed position so as to provide lateral bracing for the flexible plastic cover and thereby lends substantial rigidity thereto by means of the transverse support and the clips being supported by the pickup truck bed on which the cover is mounted. The invention also comprises novel stand bearing and connection means particularly adapted for use in pivotally connecting the U-shaped stand of the invention to a thermoplastic cover so as to provide ample structural bearing in connection of the stand bearings relative to the cover. These bearings employ inner and outer plates clamp bolted to the inner and outer sides of the thermoplastic cover so as to place substantially large areas of the cover under compressive force and so as to spread the stress of the bearing connections over a substantial area to avoid stress concentrations and incipient failures of the plastic cover at, or around the bearing connection supporting the stand bearings in connection with the cover.

Another novel feature of the invention comprises stand supporting tracks extending generally in a forward and rearward direction relative to the pickup truck bed and having generally tubular structure containing compression springs which are engaged generally by the track traversing bearings secured to the lower ends of the stand supporting legs of the invention so that when the legs are pivoted forward and traverse the tracks forwardly, so as to allow the cover to be moved downwardly into a closed position, the traversing stand bearings cause compression of the springs to thereby substantially balance the weight of the cover as it is moved towards closed position or as it may be moved towards open position in an upward direction.

The invention also comprises a novel hook shaped latch mechanism automatically adapted to hook the stand track traversing bearing structures in a position wherein they are locked in the tracks, which the bearings traverse, so as to hold the stand legs of the invention in a generally up and down position and support the cover of the invention in an elevated and safely locked position. The hook shaped locking or latching structure is pivoted generally on a horizontal axis at a location near the rearward ends of the stand bearing supporting tracks and is disposed between a track and the respective leg of one or each of the legs of the stand thereby providing a very simple and reliable stand locking or latching mechanism which is compact and may be very readily released by a finger of the operator as the stand of the mechanism is moved forwardly relative to the stand bearing tracks for lowering the cover of the invention into closed position so that it may be locked to enclose the respective pickup truck bed.

Another improvement of the invention comprises simple means for holding the stand legs of the invention securely in connection with the under side of the cover of the invention when the cover is being removed from the pickup truck bed so that the stand does not tend to pivot relative to the cover and is relatively easy to handle and so that the cover does not become damaged during the handling thereof when removed from the truck bed. The means for latching the stand legs in connection with the cover comprises resilient clip means and a modification of this structure includes a canvas supporting rail over the upper edge of which the stand leg track traversing bearings may be clipped for holding the stand in a secure stationary position in the upper inside portion of the cover when being removed and prior to the replacement of the cover in connection with the pickup truck bed.

Another improvement of the invention comprises a substantially U-shaped stand such as that disclosed in applicants prior application hereby referred to. The improvements in the stand including telescopic leg portions which permit adjustment of the legs of the stand so as to permit the cover to be supported in various elevated positions as desired. This being desirable for purposes of elevating the cover to a greater than normal elevated position so that when large articles are carried under the cover more room may be afforded, or the telescopic leg structures may be elevated substantially to provide more room under the cover when canvas is applied around the perimeter thereof to convert the cover into an enclosed camper structure in connection with a pickup truck bed substantially as disclosed in applicants prior application, Ser. No. 72,052, filed Sept. 14, 1970, all as herein before referred to.

Accordingly it is an object of the present invention to provide a cover for pickup truck beds having novel removable hinge mechanism and stand mechanism for connecting the cover to a pickup truck bed and for supporting the cover in inclined open position relative to the rearward portion of the pickup truck bed, the invention additionally comprising novel means for releasing the hinge mechanism and the stand mechanism relative to a truck bed so that the cover may readily be removed or replaced relative to a pickup truck bed with a minimum amount of time and effort.

Another object of the invention is to provide a novel releasable hinge mechanism for the forward end of a cover for a pickup truck bed.

Another object of the invention is to provide a novel inverted U-shaped stand mechanism for supporting a rearward end of a truck bed cover in open elevated position relative to the rearward end of a truck bed.

Another object of the invention is to provide a novel inverted U-shaped stand having legs and track following bearing means which traverse elongated tracks secured at inner opposite sides of a pickup truck bed.

Another object of the invention is to provide novel construction of a pickup truck bed cover wherein a thermoplastic material is used to form a shell for the cover while a metal frame is utilized for connecting hinges and stand mechanisms to the shell for pivotally connecting the shell to a pickup truck bed so that it may be pivoted on a horizontal axis near the forward end of the pickup bed and so that it may lock in enclosed position relative thereto.

Another object of the invention is to provide a novel stand mechanism for holding covers in open position relative to pickup truck beds and wherein a U-shaped stand structure is provided with legs having bearings traversing generally horizontal tracks of a channel shaped cross section, said tracks being opposed to each other and secured at opposite inner sides of the truck bed, said tracks having upper flanges having notches therein adapted to release bearings carried by ends of the legs of said stand so that the stand mechanism may be readily removed from the tracks and the truck bed without releasing bolts or other structures which normally requires a substantial amount of time to manipulate.

Another object of the invention is to provide an improved releasable hinge structure in accordance with the foregoing which is novel and readily releasable to permit removal of the cover of the invention from the truck bed without using any tools or manually removing any fixtures.

Another object of the invention is to provide a novel means for utilizing flexible plastic or thermoformed cover structures and reinforcing them with transverse support and clip structures coupled thereto and bearing on inner sides of a truck bed so as to take advantage of the strength of the truck bed to provide relative rigidity of the flexible thermoformed or plastic cover structures of the invention.

Another object of the invention is to provide a novel clip structure engaging inner opposite sides of a truck bed for locating a truck bed cover laterally in connection therewith so as to permit removable hinge structure of the invention to be installed without any end play resisting bearings.

Another object of the invention is to provide a novel spring balance mechanism comprising compression springs in the tracks of the invention which compression springs are compressively loaded by stand means, which traverse the tracks, so as to substantially balance the weight of the cover as it is elevated or lowered relative to a pickup truck bed.

Another object of the invention is to provide a novel stand latch mechanism particularly adapted automatically to latch the stand of the invention when it is moved to support the cover in elevated open position so as to prevent any possibility of the cover falling inadvertently; said latch mechanism being of a hook type mounted on a horizontal axis and readily releasable and sutomatically engagable relative to the stand bearing structure of the invention which traverses the tracks wherein the stand legs and the rearward portion of the truck bed cover are supported when in elevated position.

Another object of the invention is to provide a novel means for securing the stand legs of the invention in a non-pivoting position on the inner lower side of a truck bed cover of the invention when it is being removed from the truck bed so as to prevent unweildy pivoting of the stand during the handling of the cover when removed from the truck bed.

Another object of the is to provide an improved stand having telescopic leg portions which permit adjustment of the elevated position of the cover of the invention, when open relative to a truck bed on which the cover of the invention is mounted, whereby greater space may be provided under the cover when in open position or whereby the elevation of the cover may be adjusted substantially as desired when in open position relative to the truck bed on which the cover is mounted.

Other objects and advantages of the invention may be obtained from the following specification, appended claims, and accompanying drawings:

BRIEF DESCRIPTION OF THE DRAWINGS

FIG. 1 is a perspective view of a pickup truck showing a truck bed cover of the invention thereon and illustrating by broken lines an elevated or open position of the cover relative to the truck bed;

FIG. 2 is an enlarged side elevational view of the pickup truck bed, showing the cover of the invention in open position, by solid lines, and in closed position by broken lines, and further illustrating portions of the cover broken away and in sections to amplify the illustration;

FIG. 2a is an enlarged fragmentary sectional view taken from the line 2a—2a of FIG. 2 showing clip structure adapted for transverse location of the cover relative to the pickup truck bed shown in the FIGS. 1 and 2;

FIG. 3 is a transverse sectional view taken from the line 3—3 of FIG. 2 showing a novel cross member and clip structure for supporting a plastic or thermoformed cover of the invention relative to a pickup truck bed;

FIG. 3a is a fragmentary sectional view taken from the line 3a—3a of FIG. 2;

FIG. 4 is a sectional view taken from the line 4—4 of FIG. 2;

FIG. 5 is an enlarged fragmentary sectional view taken from the line 5—5 of FIG. 4;

FIG. 13 is an inside elevational view of one of the stand supporting track structures of the invention showing a stand leg and traversing bearing relative thereto and illustrating a stand latch mechanism of the invention;

FIG. 14 is a fragmentary top or plain view taken from line 14—14 of FIG. 13;

FIG. 15 is a fragmentary sectional view taken from the line 15—15 of FIG. 13 showing the structure in connection with the inner side of a pickup truck bed;

FIG. 16 is a perspective view of the structure shown in the FIGS. 13, 14, and 15 as the stand latch structure would appear to a person looking from a rearward central portion of a pickup truck bed upon which the cover of the invention is mounted;

FIG. 17 is the view similar to FIG. 2 but showing latch mechanism on the inner lower structure of the cover on the invention for holding the stand legs of the invention securely in connection with the cover during removal of the cover from a truck bed and for storage of the cover and stand in such a manner that the stand does not pivot and move about in an unweildy fashion relative to the cover during handing of the cover when it is being removed and replaced relative to a pickup truck bed;

FIG. 18 is a fragmentary sectional view taken from the line 18—18 of FIG. 17;

FIG. 19 is a view similar to FIG. 18 but showing a modification of the latch mechanism for holding the stand legs of the invention securely in connection with the lower inner side of the truck bed cover of the invention during removal and/or replacement of the cover relative to the truck bed;

FIG. 20 is another view similar to FIG. 2 but showing telescopic leg structure of the stand of the invention for supporting the cover of the invention in various elevated positions relative to a pickup truck bed;

FIG. 21 is a fragmentary sectional view taken from the line 21—21 of FIG. 20; and FIG. 22 is an enlarged fragmentary elevational view taken from the line 22—22 of FIG. 21 and showing portions of the structure broken away and in section to amplify the illustration.

As shown in FIG. 1 of the drawings a pickup truck 30 is provided with a generally box-shaped bed 32 which is open at its upper side and is provided with a forward end 34 and a rearward end 36 having a tailgate 38 is pivoted generally on horizontal axis near a lower rearward area 40 of the bed 32.

Figure 6:
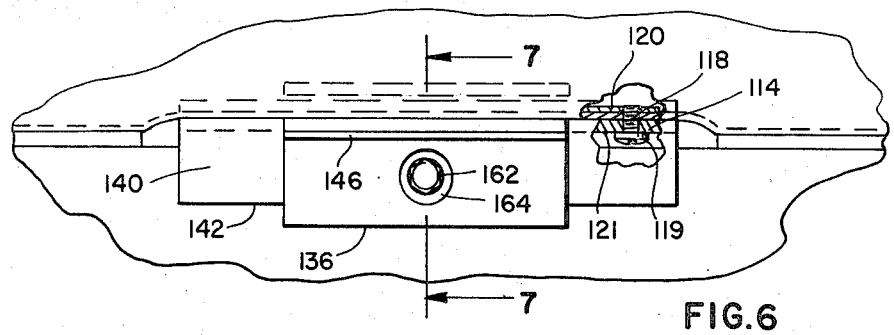
FIG. 6 is an enlarged fragmentary view taken from the line 6—6 of FIG. 2 looking forwardly into the forward end of a pickup truck bed and showing releasable hinge structure of the invention in elevation therein.

A cover 42 of the invention is pivoted generally on a horizontal axis at 44; the hinge axis being in the proximity of the forward upper end of the truck bed 32, and the cover is provided with a rearward end 46 supported by said tailgate 38 generally similar to that disclosed in applicants copending application hereinbefore referred to.

As shown in the FIG. 2 of the drawings, the truck bed 32 and the cover 42 are reversed in direction relative to that shown in FIG. 1, and the cover 42 is shown in open elevated position relative to the upper open position of the truck bed 32 by solid lines and is disclosed in broken lines in a closed locked position contiguous with the upper open side of the pickup truck bed 32.

As shown in FIG. 2a, forward opposite side portions 46 of the cover 42 carry lateral end play resisting clips 48 which are provided with outer surfaces 50 bearing against inner opposite vertical sides 52 of the truck bed 32. It will be seen that FIG. 2a represents the structural arrangement on the left side of the cover 42 and bed 32 while a similar but opposite hand structure is provided at the right hand side of the truck bed 32 and cover 42.

The end play resisting clips 48 are secured on the lower inner sides of the cover 42 by a means of carriage bolts 52 and 54. The end play resisting clips 48 are used in connection with hinges which pivot the cover 42 at the area 44 shown in FIGS. 1 and 2 and the hinges, used to pivot the cover 42, relative to the bed 32, are located generally at the area 44 and are such as to provide a readily removable relationship of the cover 42 with the bed 32 and such hinges are not generally provided with end play resisting structure so that the end play resisting clips 48 serve to locate the cover 42 laterally with respect to the truck bed 32 while the hinges as will be hereinafter described in connection with FIGS. 6, 7, and 8 serve to provide a removable pivotal connection of the cover with truck bed and to provide resistance to forward and rearward movement of the cover 42 relative to the truck bed 32. As will be hereinafter described in detail.

As shown in FIG. 2, the cover 42 is supported by a substantially U-shaped stand 56 which is preferably constructed of a single piece of pipe. This stand 56 is provided with an intermediate torque transmitting bar portion 58 and has integral hollow tubular legs 60 and 62 extending substantially at right angles thereto. Securely to these legs 60 and 62 are respective track following bearings 64 and 66 which traverse channel shaped tracks 68 and 70 respectively which are secured to inner opposite sides 72 and 74 respectively of the pickup truck bed 32.

The cover 42 is preferable a thermoformed single piece part adapted to cover the upper open side 76 of the pickup truck bed 32. This thermoformed part 42 may be of ABS or other suitable plastic material and may be quite thin, flexible, and lightweight. The torque bar portion 58 of the stand 56 is pivotally secured to the cover 42 by a means of a pair of bearings 78 and 80. The details of which are shown in FIG. 5 of the drawings. These bearings are substantially identical and therefore the description of the bearing 78 will suffice to disclose the structure of the bearing 80.

As shown in FIG. 5, the cover 42 is engaged at its inner lower surface by a clamp plate 82 and is engaged at its upper outer surface by a clamp plate 84. These clamp plates are secured together by a means of bolts 86 and 88 which also pass through and clamp laterally extending legs 90 and 92 of a U-shaped bearing clip 94 which partially surrounds the torque bar portion 58 of the stand 56. It will be seen that the clamp plate 82 provides a bearing for the torque bar 58 in opposition to U-shaped portion 94 of the bearings 78.

The clamp plates 82 and 84 provide substantially great distribution of connecting area of the bearings 78 and 80 relative to the flexible structure of the thermoformed ABS or other plastic cover structure 42. The bolts 86 and 88 passing through the clamp plates 84 and 82 clamp them on upper and lower surfaces of the cover 42 and the plate 82 also adds to the bearing surface for the torque bar portion 58 and is in opposition to U-shaped portion 94 which is also held by the bolts 86 and 88 in adjacent relationship to the clamp plate 82.

As shown in FIGS. 2, 3, and 3a, a transverse support 96 is provided for the flexible cover 42 at a location substantially midway between a forward end 45 of the cover and a rearward end 46 thereof. This transverse support 96 bears against the lower inner surface areas 98 of the cover 42 and this transverse support 96 is preferably a hollow tubular lightweight member having end portions 100 and 102 fixed by bolts 104 and 106 respectively to opposite sides of the cover 42.

As shown in FIGS. 3a, the transverse support 96 is also coupled to a clip 104 at the left side of the disclosure in FIG. 3, and similarly to a clip 106 at the right side of the disclosure in FIG. 3, thus opposite ends of the transverse support 96 are secured by the bolts 104 and 106 to the clips 105 and 108. These clips 105 and 108 bear respectively on inner sides 110 and 112 of the truck bed 32 to lend support to the transverse supporting member 96 and to prevent deflection spreading of the cover 42 at its opposite sides. Thus the clips 105 and 108 take advantage of the opposite sides 110 and 112 of the truck bed 32 for lending rigidity to the relative flexible thermoformed cover 42. It will be seen that one of the bolts 104 and one of the bolts 106 pass through the respective clips 105 and 108 and respective ends of the transverse support 96 so that a secure connection and structural continuity is maintained between the clips 105 and 108 and opposite ends of the transverse support 96.

This structure as shown in FIGS. 2, 3, 3a, and 4, provides for the construction of a very lightweight thermoformed plastic or other lightweight relatively flexible cover and reinforces it from side to side by a transverse support which employs means engagable with opposite inner sides of the truck bed to take advantage of the strength of the truck bed for rendering the flexible cover well supported and substantially more rigid than it would be without the transverse support 96 and the clips 105 and 108.

Referring to FIG. 6 of the drawing it will be seen that it is taken from the line 6—6 of FIG. 2 looking forward into the pickup truck bed and beneath the cover 42. This hinge structure provides for a readily removable relation of the cover 42 relative to the truck bed 32 and the stand 56 is substantially similar to that as disclosed in applicants co-pending patent application hereinbefore described. This stand is provided with rollers operable in tracks and readily removable from notches in the upper portions thereof as shown in applicants co-pending application and also in FIGS. 9 and 13 of the present application. Accordingly the hinge structure shown in FIGS. 6, 7, and 8 is intended for use in combination with a readily removable stand structure such as the stand structure 56 which requires no tools or removable fixtures for the removal of the cover 42 relative to the truck bed 32.

Figure 7:
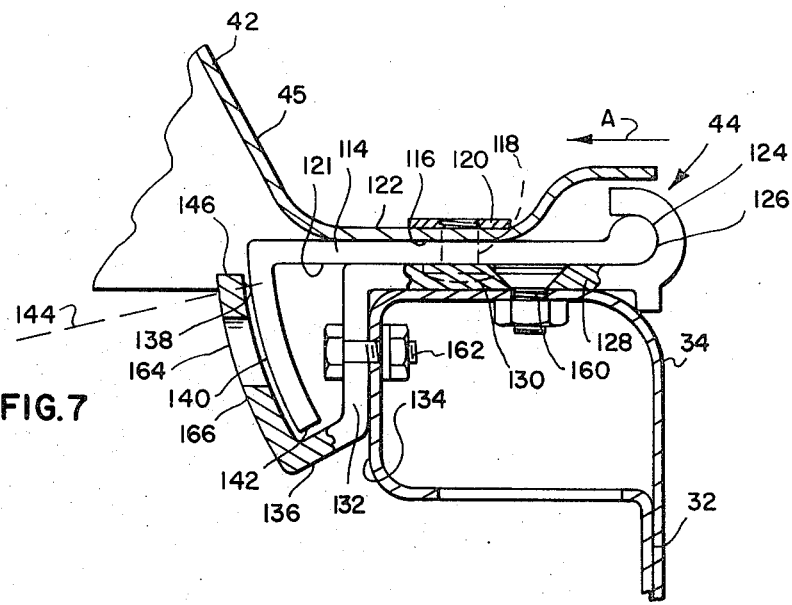
FIG. 7 is an enlarged fragmentary view taken from the line 7—7 of FIG. 6.
Figure 8:
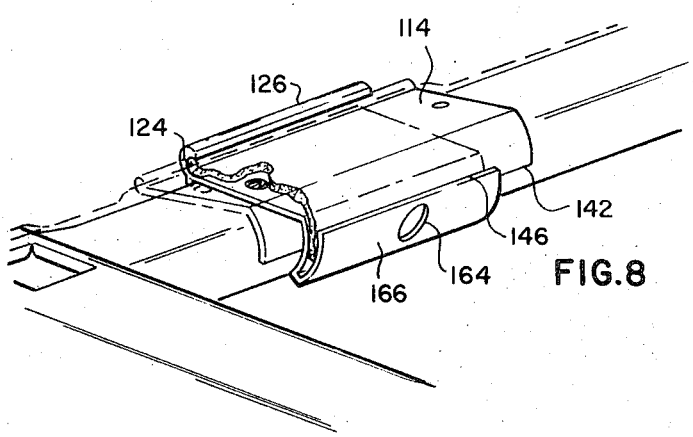
FIG. 8 is a perspective view of the hinge structure shown in FIG. 6 of the drawing.

As shown in FIGS. 6, 7, and 8 the removable hinge structure of the invention comprises a hinge member 114 which is secured to a lower surface 116 at a forward end 45 of the cover 42. This hinge member 114 is secured by bolts 118 having heads 119 engaging a lower surface 121 of the hinge member 114. These bolts 118 are screw threaded in a clamp plate 120 which is disposed on an upper surface 122 of the cover 42 and in this manner the heads of the bolts 119 are out of position to be tampered with thereby preventing persons from loosening them from outside the cover and thus preventing unauthorized removal of the cover 42 relative to the hinge member 114.

The hinge member 114 at its forward end is provided with an arcuate in cross section bar portion 124 which is engaged in a rearwardly directed arcuate hook 126 of the hinge plate member 128 secured to the forward portion 34 of the truck bed 32 as will be hereinafter described in detail.

Accordingly the hinge member 114 is adapted to the pivot the cover 42 on a horizontal axis concentrically with the arcuate bearing portion 124 and the hook 126. The hook portion 126 is open in a rearward direction as indicated by an arrow A in FIG. 7 of the drawing. The arrow A pointing toward the rearward end 46 of the cover 42 and towards the tailgate 38 of the truck bed 32.

The hinge plate 128 is provided with a horizontal portion 130 adapted to fit over the upper forward portion 34 of the truck bed 32 and integral with this hinge plate is a substantially vertically disposed portion 132 adapted to bear against an inner generally vertical surface 134 at the forward portion of the truck bed 32.

Integral with this vertical portion is a generally channel shaped portion 136 having a forwardly facing arcuate surface 138 adjacent to which an arcuate rearwardly facing portion 140 of the hinge member 114 is movably mounted. The rearwardly facing arcuate portion 140 is integral with the hinge member 114 and is movable about the axis of the hinge concentric with the arcuate portions 124 and 126 of the hinge member 114 and hinge plate 128.

The depth of the channel shaped structure 136 is such as to permit the rearwardly facing arcuate structure 140 to traverse arcuately and forwardly of the forwardly facing arcuate structure 138 of the hinge plate 130 and to attain a locking relationship of the bearing portion 124 and hook portion 126 of the hinge structure of the invention.

It will be understood that when the cover 42 is held in an elevated position by the stand 46 as shown in FIG. 2 of the drawings that the lower edge portion 142 of the arcuate rearwardly facing structure 140 is elevated to a position comparable to the broken line 144 shown in FIG. 7 which is substantially below an upper edge 146 of the forwardly facing arcuate portion 138 of the hinge plate 130. Consequently, the hinge member 114 is interlocked in the hinge plate 130 and held such that the bearing portion 124 cannot be rearwardly removed from the arcuate hook 126 when the cover 42 is in the open position and supported in normal elevated relation to the truck bed 32 by means of the stand 56.

It will be realized, however, that when the rollers 64 and 66 on the stand leg 60 and 62 are moved forwardly to a position of notches 148 in the upper flanges of the channel 68 and 70 that these rollers 64 and 66 may be moved upwardly and outwardly through the notches allowing the stand and the cover 42 to be pivoted upwardly to a higher position and angular relationship such that the lower edge 142 of the hinge member 114 clears the upper edge 146 of the hinge plate 130 allowing the bearing portion 124 of the hinge member 114 to be moved directly backwardly in the direction of the arrow A out of the hook portion 126 of the bearing plate 130 and then the cover 42 of the invention may be readied for removal from the truck bed 32.

As shown in FIGS. 17, 18, and 19 a stand holding clip structure 150 is secured on the lower inner side of the cover 42 for holding a leg 60 of the stand 56 against the upper inner side of the cover when the cover is to be removed as hereinbefore described.

The clip 150 is provided with a pair of opposed resilient loops 152 and 154 which oppositely grip the stand 60 frictionally and hold it in the position as shown in FIG. 17.

A modification of the structure shown in FIGS. 17 and 18 comprises a canvas rail 156 similar to that shown in applicants co-pending application. This canvas rail 156 is adapted to be deflected at an edge 158 so that the roller of the bearing means 64 shown in FIG. 4 of the drawings may be clipped over the upper edge 158 of the canvas rail 156 to support the stand leg 60 as shown in FIG. 17 of the drawings and in this manner the torque bar 58 also supports the stand legs 62 in a similar position to that shown in FIG. 17. Thus the removable hinge structure shown in FIGS. 6 to 8 and the stand clip 150 together with the notches 148 in the tracks 68 and 70 provide for readily removable operation of the cover 42 relative to the truck bed 32 without disconnecting any fixtures or removing any parts and reverse operation may be followed to replace the cover as will be hereinafter described in detail.

Referring to FIG. 2 of the drawings it will be seen that the cover 42 is provided with a lock mechanism 158 similar any the mechanisms disclosed in applicants co-pending application for locking the rearward portion 46 of the cover 42 downwardly in connection with the rearward portion of the truck bed 32. In this manner the rearward portion of the cover 42 is fixed to the truck bed 32 and the forward portion of the cover 42 is held by the hinge member 114 and the hinge plate 130. Referring now to FIGS. 6, 7, and 8 of the drawings it will be seen that the hinge plate 130 is secured to an upper portion of the truck bed 32 by a means of counter sunk screws 160 and also by bolts 162 which extend through a portion 134 of the truck bed and the vertical portion 132 of the hinge plate 130. It will be seen that an access hole 164 is provided in the portion 166 of the hinge plate 130 in order to utilize a wrench for handling the bolt 162 during loosening or tightening thereof. The opening 164 extends from the rear side of the portion 166 to the forwardly facing arcuate portion 38 hereinbefore described and this opening 154 may accomodate a thin wall socket or another wrench to hold the head of the bolt 162. All is shown best in FIGS. 6, 7, and 8 of the drawings.

A stand latch structure of the invention is shown in FIGS. 13, 14, 15, and 16 of the drawings and this stand latch structure may be located near the rearward end of either of the channel shaped tracks 68 and 70 as shown in FIG. 4 of the drawings. Accordingly, the latch structure of FIGS. 13, 14, 15, and 16 is shown adjacent a rearward end of 168 of the track 70. Correspondingly, the latch is shown adjacent to the stand leg 62 and is related to the latching of the stand leg bearing 66 in a position near to the rear end 168 of the channel track 70 for holding the stand 56 in the position such as shown in FIGS. 2 and 4 of the drawings; all as will be hereinbefore described in detail.

As shown in FIGS. 13, 14, and 15 of the drawings the tracks following bearings, namely the roller 66 is provided with a reduced diameter shank 170 abutted to the stand leg 62 and held in connection therewith by a bolt 172 which passes through a lower portion of the stand leg 62 an provides a rotary mounting for the roller 66.

Located between the stand leg 62 and an inner side 172 of the track 170 is a hook shaped portion 174 of a stand latch 176 of the invention. This stand latch 176 is pivotally mounted on a bolt 178 which is provided with a head 180 having a shank 182 integral with a reduced diameter bolt portion 184 which passes through a sleeve 186 abutted to a side wall 188 of the track 70 which is clamped against an inner side 74 of the pickup truck bed 32. It ill be seen that the bolt 180 with its shoulder 182 forms a bearing for a portion 190 of the stand latch 176. This portion 190 is provided with an opening fitted over the shoulder 182 and the length of the shoulder 182 is greater than the thickness of the portion 190 and an adjacent washer 192. The shoulder 182 abuts the bushing 186 and clamps it tightly against the side wall 188 of the track 70 and a nut 194 screw threaded on the reduced diameter shank 178 of the bolt 180 holds the bushing 186 tightly clamped against the side wall 188 of track 70 and tightly clamped in connection with the inner side 74 of the truck bed 32. Thus the latch 176 is free to pivot about the axis of the shoulder 182 of the bolt 180 and this latch is generally L-shaped in cross-section, as shown in FIG. 16 of the drawings, and has vertical portion 196 pivotally mounted on the shank 182 of the bolt 180 and the latch member is provided with an integral horizontal portion 198 adapted to overly and generally bear upon an upper surface 200 of the track 70. Integral with the horizontal portion 198 is an angularly disposed finger engaging tab 202 adapted for raising the hook portion 174 out of interference with the shank 170 of the roller 66 so as to release the roller and stand 62 for forward movement relative to the track 70. As shown in FIGS. 13 and 16 it will be seen that the hook 174 is provided with an inclined cam like forward edge 204 which will cause camming action of the latch into an upper broken line position 206 when the roller 66 is moved backwardly such that its shank 170 cams against the inclined portion 204 of the hook 174. When the shank 170 of the roller 66 has passed the hook portion 174 a retaining hook portion 208 opposed to the incline portion 104, engages the shank portion 170 of the roller 66 by dropping downwardly and forwardly thereof such that the roller 66 is prevented from moving in a forward direction as indicated by arrow B in FIG. 13 of the drawing. Only when the manually engageable tab 202 is moved upwardly will the hook portion 208 be relieved from its interferring position with the shank 170 and allow the stand 62 together with the roller 66 to be moved relative to the track 70, in the direction of the arrow B, and thus permit the stand together with its torque bar 58 and its other leg 50 to traverse the tracks 68 and 70 so as to lower the cover 42 to a closed position relative to the truck bed 32 as indicated by broken lines in FIG. 2 of the drawings.

Figure 9:
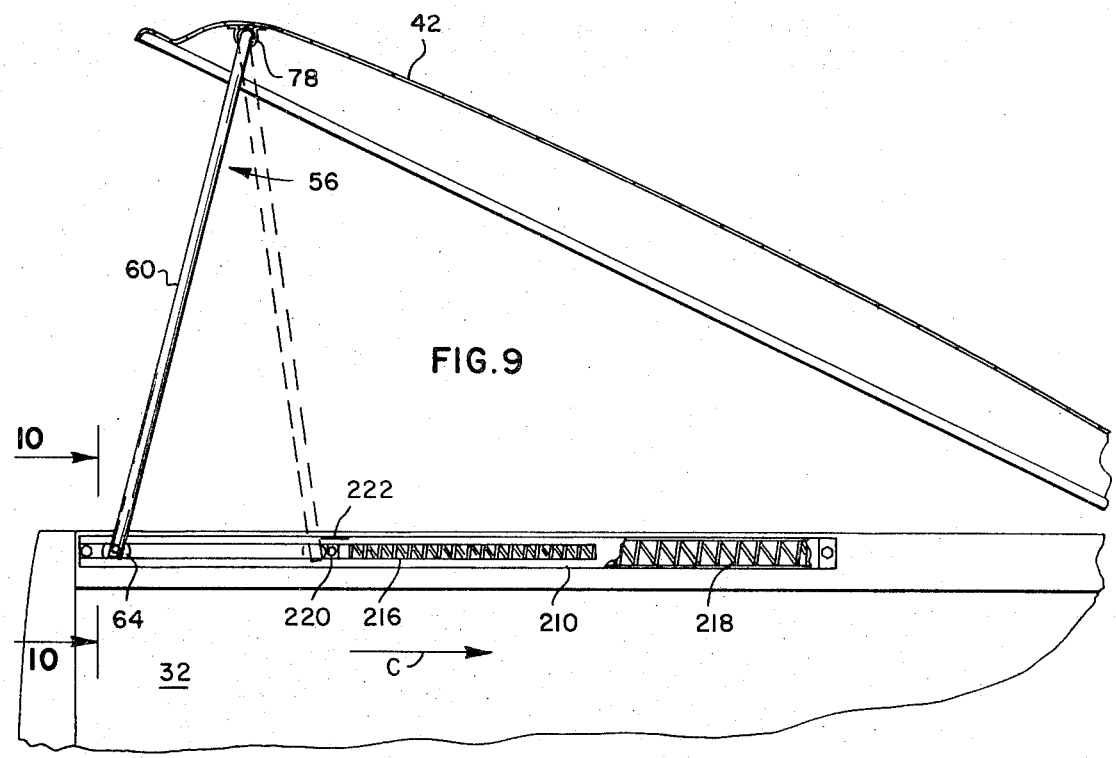
FIG. 9 is a view of similar to FIG. 2 showing portions of the truck bed and cover fragmentarily and illustrating a novel compression spring balance mechanism in connection with the tracks traversed by the stand leg bearings of the invention.
Figure 10:
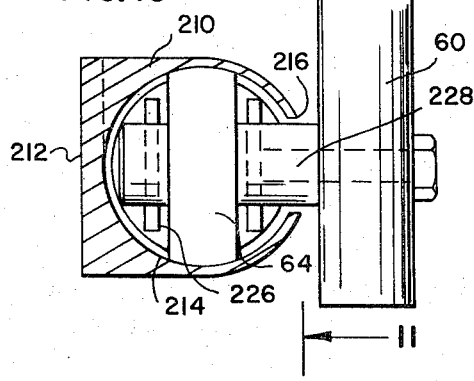
FIG. 10 is an enlarged fragmentary sectional view taken from the line 10—10 of FIG. 9.
Figure 11:
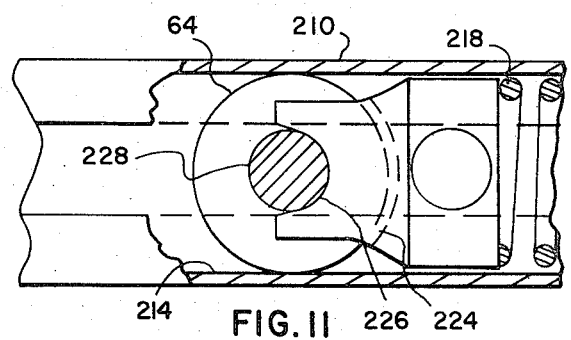
FIG. 11 is a fragmentary sectional view taken from the line 11—11 of FIG. 10'
Figure 12:
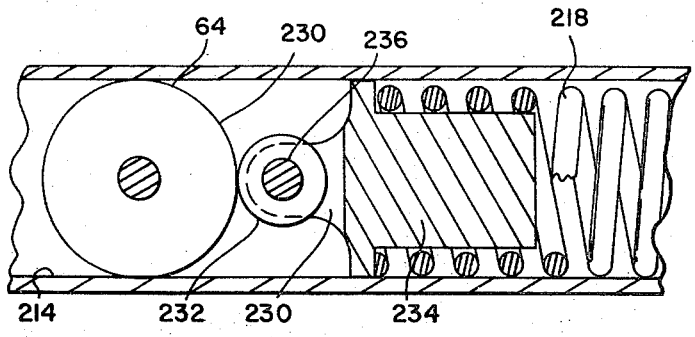
FIG. 12 is a view similar to FIG. 11 but showing a modification of the structure disclosed therein.

In the modification of the invention as shown in FIGS. 9, 10, 11, and 12 of the drawings, tracks such as the tracks 68 and 70 will be located for supporting the track engaging bearing means secured to the lower ends of the stand legs 60 and 62 respectively. These tracks as shown in FIGS. 9 and 12 of the drawings are designated 210 and it will be understood that only one track is shown in these figures, however a pair of these tracks which are opposite hand to each other will be utilized in a similar manner to the tracks 68 and 70 disclosed in FIG. 4 of the drawings.

The track 210 as shown in FIGS. 9, 10, 11, and 12 of the drawings is provided with flat side 212 shown in FIG. 10. This side is secured to an inner side of the pickup truck bed either the side 72 or 74 respectively and the track 210 is provided with a generally circular bore portion 214 having a longitudinal slot 216 side wall portion thereof. Disposed in this track 216 is a coil compression spring 218 whose free length is such that an engagable end structure 220 is disposed slightly forward of a track notch 222 similar to a notch 148 disclosed in FIGS. 13 and 14 of the drawings and in applicants co-pending application hereinbefore referred to. The notch 222 being for use in removing a track following bearing means coupled to a respective stand leg 62 hereinbefore described. Thus the roller 66 may be removed upwardly through the opening 222 with the spring 218 fully extended whereby its end engaging structure 220 does not interfere with the removal of the track following bearing means or roller 66 from the slot 222.

The compression spring 218 as shown in FIG. 11 is provided with an end fixture structure 224 having arcuate cradle portions 226 engagable with a shank 228 on which the roller 66 may be supported. The roller 66 constitutes a track following the bearing means coupled to the stand leg 62 and it traverses the bore 214 of the track 210. The end structure 224 as shown in FIG. 11 of the drawings thus serves as a cradle to engage the shank 228 thus permitting the roller 64 to rotate freely in the bore 214 of the track 210 while compressing the spring 218 as the roller moves forwardly in the track 210 in the direction of an arrow C in FIG. 9 of the drawings.

In accordance with the modification of the structure shown in FIG. 11 the roller 64 at its periphery 230 may engage a roller 232 on an end structure 234 which is substantially rigid. The roller 232 being mounted on a pin 236 in a bifurcated portion 238 on the end structure 234. The spring 218 is shouldered on the periphery of the end structure 234 so that the roller 264 is free to rotate in the bore 214 while exerting pressure on the end structure 234 through to the medium of the roller 232 for compressing the spring 218 longitudinally in the respective track 210 during forward movement of the roller 264 in the direction of the arrow C when moving the cover 42 downwardly toward a closed position relative to the truck bed 32.

It will be seen that the rate of the spring 218 may be closely matched to the variable moment arm factor of the stand 56 as it pivots about its bearings 78 and 80. The angular disposition of the stand varies as the spring becomes compressed gradually or progressively so that the moment arm, about which the spring force acts, is diminished as the cover 42 moves downwardly while the compressive force of the spring increases, thus the maximum compressive force of the spring is attained when the moment arm acting about the stand bearing 78 is at a minimum. Consequently, the spring force of the spring 218 and its counter parts in the other of the tracks may substantially compensate or the weight of the cover 42 at any particular elevated position. It is contemplated that the combined force of the two springs of the two tracks may be slightly less at various angular operating positions of the stand 56 so as to almost completely compensate for the weight of the cover 42 as it is pivoted upwardly and downwardly without requiring undue force for the closing of the cover against the upper surface of the truck bed and locking it by means of the lock mechanism 158 hereinbefore described.

In the modification as shown in FIGS. 20, 21, and 22 a telescopic mechanism is provided for the stand and this applies generally to the stand mechanism 56. FIG. 20 is similar to FIG. 2 and lower ends of the stand legs such as the legs 60 and 62 shown in FIG. 4 of the drawings are provided with external tubular telescopic members 238 which fit over legs 240 which are similar to the legs 60 and 62 hereinbefore described. These telescopic tubular members 238, as shown in FIG. 21 of the drawings, have lower ends 240 through which bolts 246 are disposed. These bolts are similar to the hereinbefore described bolt 172 holding the roller 66 and the bolts 246 thus are carried by rollers such as the roller 66 or other similar rollers in the channel tracks. Accordingly, both legs such as the legs 60 and 62 of the stand 56 are provided with a telescopic member 238 as shown in FIGS. 20, 21, and 22. A lower end portion 248 of the stand leg 240, as shown in FIG. 21, is adjacent to the bolt 246 and both the telescopic tubular member 238 and the stand leg 240 are provided with a plurality of longitudinal spaced apart holes 250 extending therethrough and cotter pins 252 may be placed in some of the holes for affixing the telescopic member 238 relative to the respective tubular leg 240 thus the tubular leg 240 may be slidably extended relative to the telescopic member 238 when the cotter pins 252 are removed and the respective leg 240 may be moved upwardly in the telescopic member 238 and the cotter pins replaced in different holes so as to cover 42 in a broken line position 252 which is higher than the position indicated at 254 which is the normal open elevated position of the cover 42 relative to the truck bed 32. It will be seen that when the cover 42 is in the broken line position 252 it is sufficiently high so that the canvas around the outer sides and the rear end thereof extents the living area inside the pickup truck bed considerably especially elevation wise and this is a desired improvement in the event a camper wishes to have more headroom in the camper supported on the truck bed cover of the present invention. Accordingly, if it is anticipated that the camping will always be carried on with the truck bed cover in the upper most position 252 the canvas will be tailored likewise so as to fit the side areas between the elevated position 252 and the truck bed 232 and also to fit the area at the rear end of the cover 42 and the respective tailgate area of the pickup truck bed 32.

It will be obvious that the various modifications of the present invention may be resorted to without departing from the spirit of the invention.

We claim:

1. In a truck bed cover, the combination of: a cover adapted to enclose the open upper side of a generally box-shaped pickup truck bed; said covering having a forward end adapted to be disposed adjacent to a pickup truck cab; said cover having a rearward end adapted to be disposed adjacent a pickup truck tailgate; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate stand means adapted to support said cover in said raised position relative to said truck bed; said stand means having structure of a configuration which is generally U-shaped; said U-shaped structure being disposed in an inverted position when said rearward portion of said cover is supported in raised position by said stand means; sid U-shaped structure of said stand means comprising an intermediate horizontally disposed torque transmitting bar portion; bearing means carried by said cover, said bar portion being pivotally carried by said bearing means; said bearing means having a generally horizontal axis; said U-shaped structure of said stand also having a pair of legs; said legs having first ends fixed to said bar portion; said legs extending downwardly from said bar portion when said stand means supports said cover in raised position; said legs being disposed adjacent respective opposite sides of said cover and adapted to straddle an inner load-carrying area of said truck bed; said legs having second ends; track following bearing means carried at said second ends of said legs; and a pair or elongated tracks having forward and rearward ends, said tracks adapted to be secured to opposite inner sides of a pickup truck bed in adjacent relation to said opposite sides of said cover; said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; said cover being of material which is flexible relative to a pickup truck bed; transverse support structure secured to and engaging an inner lower side of said cover at a location between said forward and rearward ends of said cover; said support structure having means at its opposite ends extending below said cover and engagable with opposite inner sides of a truck bed to prevent substantial lateral deflection of said cover relative to said truck bed when said cover is in closed position thereon.

2. In a truck bed cover, the combination of: a cover adapted to enclose the open upper side of a generally box-shaped pickup truck bed; said cover having a forward end adapted to be disposed adjacent to a pickup truck cab; said cover having a rearward end adapted to be disposed adjacent a pickup truck tailgate; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said stand means having structure of a configuration which is generally U-shaped; said U-shaped structure being disposed in an inverted position when said rearward portion of said cover is supported in raised position by said stand means; said U-shaped structure of said stand means comprising an intermediate horizontally disposed torque transmitting bar portion; bearing means carried by said cover; said bar portion being pivotally carried by said bearing means; said bearing means having a generally horizontal axis; said U-shaped structure of said stand also having a pair of legs; said legs haivng first ends fixed to said bar portion; said legs extending downwardly from said bar portion when said stand means supports said cover in raised position; said legs being disposed adjacent respective opposite sides of said cover and adapted to straddle an inner loadcarrying area of said truck bed; said legs having second ends; track following bearing means carried at said second ends of said legs; and a pair of elongated tracks having forward and rearward ends; said tracks adapted to be secured to opposite inner sides of a pickup truck bed in adjacent relation to said opposite sides of said cover; said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; elongated coil compression springs having longitudinal axes substantially parallel with said tracks; said springs carried by said tracks and compressible in a direction parallel with said tracks; and means at said second end of said legs disposed to engage said springs and to cause progressive deflection thereof during a closing movement of said cover when said second ends of said legs move toward a forward end of said cover and said truck bed whereby an increasing force of said springs is obtained in proportion to a degree to which said cover is moved toward closed position thereby substantially balancing vertical gravity loading of said cover; said tracks are each provided with channel shaped in cross section structure and are so disposed that said channel shaped structure is open in a direction facing inwardly relative to respective opposite sides of said cover; a respective one of said track following bearing means disposed and movable in each channel shaped structure; said channel shaped structure being provided with lower and upper flanges, the upper one of said flanges having an opening adapted to permit upward vertical movement of a respective one of said track following bearing means therethrough; said springs being compression springs and when fully extended being forward relative to respective openings in said flanges so as to not interfere with the removal of said track following bearing means upwardly therethrough.

3. In a truck bed cover, the combination of: a cover adapted to enclose the open upper side of a generally box-shaped pickup truck bed; said cover having a forward end adapted to be disposed adjacent to a pickup truck cab; said cover having a rearward end adapted to be disposed adjacent a pickup truck tailgate; Said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said stand means having structure of a configuration which is generally U-shaped; sand U-shaped structure being disposed in an inverted position when said rearward portion of said cover is supported in raised position by said stand means; said U-shaped structure of said stand means comprising an intermediate horizontally disposed torque transmitting bar portion; bearing means carried by said cover; said bar portion being pivotally carried by said bearing means; said bearing means having a generally horizontal axis; sand U-shaped structure of said stand also having a pair of legs; said legs having first ends fixed to said bar portion; said legs extending downwardly from said bar portion when said stand means supports said cover in raised position; said legs being disposed adjacent respective opposite sides of said cover and adapted to straddly an inner loadcarrying area of said truck bed; said legs having second ends; track following bearing means carried at said second ends of said legs; and a pair of elongated tracks having forward and rearward ends, said tracks adapted to be secured to opposite inner sides of a pickup truck bed in adjacent relation to said opposite sides of said cover; said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; stand latch means pivoted on a horizontal axis at a rearward portion of one of said tracks; said latch means having a downwardly directed hook; a respective leg of said stand having an axially horizontal structure of said track following bearing means adapted to be engaged by said hook when said track following bearing means is moved to a rearward position of said track and when said cover is supported in elevated open position by said stand means.

4. The invention as defined in claim 3 wherein said hook is disposed to operate pivotally about said horizontal axis and is located between said respective stand leg and a respective one of said tracks.

5. In a truck bed cover, the combination of: a cover adapted to enclose the open upper side of a generally box-shaped pickup truck bed; said cover having a forward end adapted to be disposed adjacent to a pickup truck cab; said cover having a rearward end adapted to be disposed adjacent a pickup truck tailgate; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said stand means having structure of a configuration which is generally U-shaped; said U-shaped structure being disposed in an inverted position when said rearward portion of said cover is supported in raised position by said stand means; said U-shaped structure of said stand means comprising intermediate horizontally disposed torque transmitting bar portion; bearing means carried by said cover; said bar portion being pivotally carried by said bearing means; said bearing means having a generally horizontal axis; said U-shaped structure of said stand also having a pair or legs, said legs having first ends fixed to said bar portion; said legs extending downwardly from said bar portion when said stand means supports said cover in raised position; said legs being disposed adjacent respective opposite sides of said cover and adapted to straddle an inner loadcarrying area of said truck bed; said legs having second ends; track following bearing means carried at said second ends of said legs; and a pair of elongated tracks having forward and rearward ends; said tracks adapted to be secured to opposite inner sides of a pickup truck bed in adjacent relation to said opposite sides of said cover; said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; said first mentioned bearing means which is carried by said cover each having a substantially U-shaped bearing member provided with bolt receiving flanges; said bearing means being opened toward an inner side of said cover and bolted to said inner side of said cover and holding said torque bar portion of said stand adjacent said cover.

6. The invention as defined in claim 5 wherein clamp plates are continguous to the inner and outer sides of said cover; and bolts extending through said clamp plates and said flanges of said U-shaped bearing members and clamping said clamp plates and said U-shaped bearing members securely in connection with said cover.

7. In a truck bed cover, the combination of: a cover adapted to enclose the open upper side of a generally box-shaped pickup truck bed; said cover having a forward end adapted to be disposed adjacent to a pickup truck cab; said cover having a rearward end adapted to be disposed adjacent a pickup truck tailagte; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said stand means having structure of a configuration which is generally U-shaped; said U-shaped structure being disposed in an inverted position when said rearward portion of said cover is supported in raised position by said stand means; said u-shaped structure of said stand means comprising an intermediate horizontally disposed torque transmitting bar portion; bearing means carried by said cover; said bar portion being pivotally carried by said bearing means; said bearing means having a generally horizontal axis; said U-shaped structure of said stand also having a pair of legs; said legs having first ends fixed to said bar portion; said legs extending downwardly from said bar portion when said stand means supports said cover in raised position; said legs being disposed adjacent respective opposite sides of said cover and adapted to straddle an inner loadcarrying area of said truck bed; said legs having second ends; track following bearing means carried at said second ends of said legs; and a pair of elongated tracks having forward and rearward ends; said tracks adapted to be secured to opposite inner sides of a pickup truck bed in adjacent relation to said opposite sides of said cover; said tracks being elongated in a generally forward and rearward direction relative to said pickup truck bed; said track following bearing means at said second ends of said legs being adapted to engage and follow respective ones of said tracks, whereby said legs are disposed generally in an up and down disposition when said cover is in raised position and said legs are disposed in a more nearly horizontal position when said cover is lowered to enclose the upper open side of said pickup truck bed; said pickup truck bed having a forward end provided with a forward extremity adjacent to said cab; said forward end having an upper generally horizontal surface and an inner end surface disclosed in a generally upward and downward direction; said hinge means having a first hinge plate with a first elongated hinge bearing means disposed on said horizontal axis; said hinge plate adapted to be fixed near said forward end of said pickup truck bed adjacent said upper surface thereof; said first elongated hinge bearing means being located near said forward extremity of said forward end of said truck bed; said first hinge plate having a generally horizontal plate portion extending in a rearward direction from said first elongated hinge bearing means towards said inner end surface of said forward end of said pickup truck bed; said horizontal plate portion having a generally channel shaped portion fixed thereto and extending downwardly a considerable distance below said horizontal plate portion; said generally channel shaped portion having a side wall bearing surface portion facing forward toward said elongated hinge bearing means; a second hinge plate secured to said forward end of said cover and having a second elongated hinge bearing means abuttingly and pivotally engaging said forst elongated hinge bearing means; said first elongated hinge bearing means having a cross sectional shape defining a generally hook shaped structure which is open towards said side wall bearing surface; said second elongated hinge bearing means engaged in said hook shaped structure; said second hinge plate having a downwardly extending plate portion provided with a surface portion which is arcuately movable about said horizontal axis; said surface portion disposed to be pivoted in close proximity to said side wall bearing surface of said first hinge plate.

8. The invention as defined in claim 7 wherein said side wall bearing surface portion of said first hinge plate is provided with an upper terminal edge portion; said downwardly extending plate portion having a normally lower edge; said normally lower edge of said downwardly extending plate portion of said first hinge plate being below said terminal upper edge portion of said side wall bearing surface of said first hinge plate when said stand means supports said cover in a normal raised position.

9. The invention as defined in claim 8 wherein said tracks are each provided with a channel shaped and cross section structure and are so disposed that said channel shaped structure is open in a direction facing inwardly relative to respective opposite sides of said cover; a respective one of said tracks following bearing means disposed and movable in each channel shaped structure; said channel shaped structure each being provided with lower and upper flanges, the upper one of said flanges having an opening adapted to permit upward vertical movement of a respective one of said tracks following bearing means therethrough in order to permit further upward movement of said cover above and beyond the normally raised position thereof; said lower edges of said downwardly extending plate portion being above said terminal edge when said track following bearing means are removed through said openings in said flanges and when said cover is pivoted upwardly about said horizontal axis a substantial amount to a position wherein the rear end of said cover is substantially above said raised position whereby said second elongated hinge bearing means may be readily moved in a rearward direction out of engagement with said hook shaped structure.

10. In a truck bed cover, the combination of: a cover adapted to enclose the upper open side of a generally box-shaped pickup truck bed; said cover having forward end adapted to be disposed adjacent to a pickup truck cab; said cover having a rearward end adapted to be disposed adjacent a pickup truck tailgate; said cover having opposite sides extending between said forward and rearward ends; hinge means at said forward end of said cover and adapted pivotally to couple said forward end of said cover to said pickup truck bed; said hinge means having a horizontal axis whereby said rearward end of said cover may be elevated to a raised position relative to said tailgate; stand means adapted to support said cover in said raised position relative to said truck bed; said pickup truck bed having a forward end provided with a forward extremity adjacent to said cab; said forward end having an upper generally horizontal surface and an inner end surface disposed in a generally upward and downward direction; said hinge means having a first hinge plate provided with a first elongated hinge bearing means disposed on said horizontal axis; said hinge plate adapted to be fixed to said forward end of said pickup truck bed adjacent said upper and inner end surfaces thereof; said first elongated hinge bearing means being located near said forward extremity of said forward end of said truck bed; said first hinge plate having a generally horizontal plate portion extending in a rearward direction from said first elongated hinge bearing means towards said inner end surface of said forward end of said pickup truck bed; said horizontal plate portion having a generally channel shaped portion fixed thereto and extending downwardly a considerable distance from said horizontal plate portion; said generally channel shaped portion having a side wall bearing surface portion facing forwardly toward said first elongated hinge bearing means; a second hinge plate secured to said forward end of said cover and having second elongated hinge bearing means abuttingly and pivotally engaging said first elongated hinge bearing means; said first elongated hinge bearing means having a cross sectional shape defining a generally hook shaped structure which is open towards the side wall bearing surface; said second elongated hinge bearing means engageable in said hook shaped structure; said second hinge plate having a downwardly extending plate portion provided with a surface portion which is arcuately movable about said hinge axis; said surface portion disposed to be in close proximity to said side wall bearing surface of said first hinge plate; said side wall bearing surface portion of said hinge plate having an upper terminal edge portion; said downwardly extending plate portion having a normally edge; said normally lower edge of said downwardly extending plate portion of said first hinge plate when said stand means supports said cover in raised position; said lower edge of said downwardly extending plate being above said terminal edge when said cover is pivoted upwardly about said horizontal axis a substantial amount to a position wherein the rear end of said cover is substantially above said raised position whereby said second elongated hinge bearing means may be readily moved in a rearward direction out of engagement with said hook shaped structure.

* * * * *